US009688332B2

(12) United States Patent
Hayashi et al.

(10) Patent No.: US 9,688,332 B2
(45) Date of Patent: Jun. 27, 2017

(54) HEADLAMP ASSEMBLY FOR A SADDLE-TYPE VEHICLE

(71) Applicant: HONDA MOTOR CO., LTD., Minato-Ku, Tokyo (JP)

(72) Inventors: Hiroshi Hayashi, Saitama (JP); Nobuyuki Takenaka, Saitama (JP); Naoki Murasawa, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 39 days.

(21) Appl. No.: 14/212,519

(22) Filed: Mar. 14, 2014

(65) Prior Publication Data
US 2014/0286026 A1 Sep. 25, 2014

(30) Foreign Application Priority Data
Mar. 22, 2013 (JP) .................. 2013-059918

(51) Int. Cl.
| B62J 6/00 | (2006.01) |
| F21V 33/00 | (2006.01) |
| B62J 6/02 | (2006.01) |
| B60Q 1/00 | (2006.01) |
| F21S 8/10 | (2006.01) |
| B60Q 1/26 | (2006.01) |
| B60Q 1/56 | (2006.01) |

(52) U.S. Cl.
CPC .............. B62J 6/02 (2013.01); B60Q 1/0041 (2013.01); B60Q 1/0094 (2013.01); B60Q 1/2626 (2013.01); B60Q 1/56 (2013.01); F21S 48/33 (2013.01); F21S 48/335 (2013.01)

(58) Field of Classification Search
CPC ........ B60Q 1/0094; B60Q 1/0041; B62J 6/02; B62J 6/06; F21S 48/335
USPC .................................................. 362/475, 476
See application file for complete search history.

(56) References Cited

U.S. PATENT DOCUMENTS

| 7,427,152 B2* | 9/2008 | Erion ................... F21S 48/1159 362/373 |
| 7,537,362 B2* | 5/2009 | Kushida et al. .............. 362/473 |
| 2006/0193143 A1* | 8/2006 | Ohira ............................ 362/473 |
| 2008/0192498 A1* | 8/2008 | Suita ............................. 362/475 |
| 2008/0239737 A1* | 10/2008 | Aoki ............................. 362/475 |
| 2009/0201688 A1* | 8/2009 | Liao ............................. 362/473 |
| 2014/0313762 A1* | 10/2014 | Owada .......................... 362/538 |

FOREIGN PATENT DOCUMENTS

JP 2009-202670 A 9/2009

* cited by examiner

*Primary Examiner* — Peggy Neils
*Assistant Examiner* — William N Harris
(74) *Attorney, Agent, or Firm* — Carrier Blackman & Associates, P.C.; Joseph P. Carrier; Anne G. Sabourin

(57) ABSTRACT

A headlamp assembly for a saddle-type vehicle includes left and right light-emitting portions arranged on left and right sides, respectively, of a housing. Each of the light-emitting portions includes a light source and a concave reflector, disposed proximate the light source for reflecting light forwardly. Each reflector has an inclined surface configured such that the rear surfaces of the reflectors extend in directions separating from each other as the reflectors extend rearwardly. A driver for driving the light sources of the left and right light-emitting portions is arranged behind and in between the left and right reflectors.

7 Claims, 14 Drawing Sheets

HEADLAMP ASSEMBLY FOR A SADDLE-TYPE VEHICLE

CROSS-REFERENCE TO RELATED APPLICATIONS

The present invention claims priority under 35 USC 119 based on Japanese Patent Application No. 2013-059918, filed on Mar. 22, 2013. The entire subject matter of this priority document, including specification claims and drawings thereof, is incorporated by reference herein.

BACKGROUND OF THE INVENTION

1. Field of the Invention

The present invention relates lighting equipment for a saddle-type vehicle. More particularly, the present invention relates to a headlamp assembly for a saddle-type vehicle.

2. Description of the Background Art

The following Patent Literature 1 discloses a known structure for a headlamp assembly where a headlight driver having headlight units on left and right sides, respectively, is arranged between reflectors of the left and right headlight units.

[Patent Literature 1] JP-A-2009-202670

However, in the above-mentioned Patent Literature 1, the driver is arranged between the reflectors of the headlight units and hence, unless the thickness direction of the driver is set to the left-and-right direction, the respective arrangement positions of the headlight units are excessively spaced apart or away from each other and hence, the degree of freedom in the arrangement of the driver is restricted.

Accordingly, it is an object of the present invention to provide a headlamp assembly for a saddle-type vehicle which can enhance the degree of freedom in the arrangement position of a driver.

SUMMARY OF THE INVENTION

Reference numbers are included in the following description corresponding to the reference numbers used in the drawings. Such reference numbers are provided for illustration and are not intended to limit the invention.

A headlamp assembly (10) of a saddle-type vehicle (12) according to an illustrative embodiment of the invention has the following technical features.

First Technical Feature:

The headlamp assembly (10) of a saddle-type vehicle (12) where between light-emitting portions (110L, 110R, 112L, 112R) having light sources (114) and reflectors (116) which reflect light from the light sources (114) frontward which are arranged on left and right sides respectively, a driver (142) for driving the light sources (114) is arranged, wherein the left and right reflectors (116) have inclined surfaces (119) whose rear surfaces extend in the direction separating from each other as the reflectors (116) extend rearward, and the driver (142) is arranged between the left and right reflectors (116) and behind and in the vicinity of the left and right reflectors (116).

Second Technical Feature:

The headlamp assembly (10) of a saddle-type vehicle (12) includes a housing (100) which supports the light-emitting portions (110L, 110R, 112L, 112R) in a state where the housing (100) covers the light-emitting portions (110L, 110R, 112L, 112R) from behind, and a lens (102) which covers a front side of the light-emitting portions (110L, 110R, 112L, 112R) while allowing light to pass therethrough, and the driver (142) is supported on a rear surface wall (100a) of the housing (100).

Third Technical Feature:

The driver (142) has a waterproof function, and is supported on an outer side of the rear surface wall (100a) of the housing (100).

Fourth Technical Feature:

The driver (142) is arranged in a recessed portion (144) indented forwardly which is formed on the rear surface wall (100a) of the housing (100).

Fifth Technical Feature:

The driver (142) is a headlight-use driver for driving the light source (114) for a headlight, the headlamp assembly (10) includes a turn signal lamp (130), a signal-lamp driver (140) for the turn signal lamp (130) is arranged in the inside of the housing (100) in a state where the rear surface wall (100a) of the housing (100) is sandwiched between the headlight-use driver (142) and the signal-lamp driver (140).

Advantages of the Invention

According to the first technical feature of the invention, the driver is arranged between the left and right reflectors and behind and in the vicinity of the left and right reflectors and hence, the degree of freedom in the arrangement position of the driver is enhanced. Further, the reflectors have inclined surfaces whose rear surfaces extend in the direction separating from each other as the reflectors extend rearward and hence, the driver provided between the left and right light-emitting portions can be arranged on a more frontward side whereby the headlamp assembly can be miniaturized.

According to the second technical feature of the invention, the driver is supported on the rear surface wall of the housing and hence, the driver which is arranged behind and in the vicinity of the reflectors can be easily supported.

According to the third technical feature of the invention, the driver has a waterproof function and is supported on the outer side of the rear surface wall of the housing and hence, the heat radiation performance of the driver is enhanced.

According to the fourth technical feature of the invention, the driver is arranged in the recessed portion indented forwardly which is formed on the rear surface wall of the housing and hence, a power line which connects the driver and the light source can be shortened.

According to the fifth technical feature of the invention, the driver is the headlight-use driver for driving the light source for a headlight, the signal-lamp driver for the turn signal lamp is arranged in the inside of the housing in a state where the rear surface wall of the housing is sandwiched between the headlight-use driver and the signal-lamp driver. Accordingly, it is possible to protect the signal-lamp driver from water or dust. The driver usually has a plate shape or a box shape and hence, it is desirable that a mounting surface on which the driver is mounted has a flat surface. Since the signal-lamp driver can be mounted by making use of a flat surface which constitutes a mounting surface of the rear surface wall provided for mounting the headlight-use driver, it is unnecessary to additionally provide mounting surfaces for mounting the respective drivers thus eventually making the headlamp assembly compact.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinafter, a headlamp assembly for a saddle-type vehicle according to the invention is explained in detail in conjunction with a preferred embodiment of the headlamp assembly by reference to attached drawings.

Figure 1:
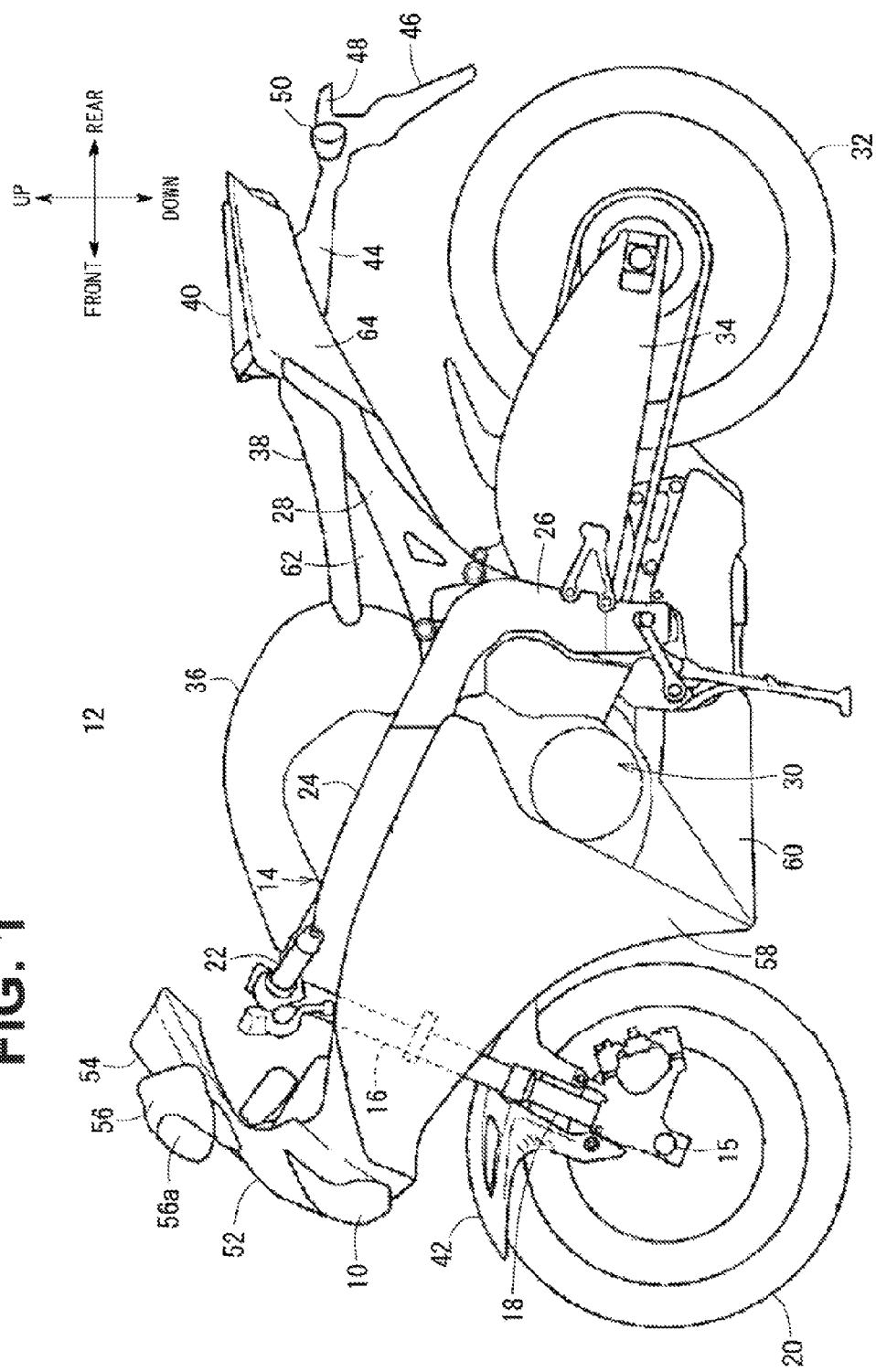
FIG. 1 is a left side view showing an external appearance of a motorcycle which is an example of a saddle-type vehicle on which a headlamp assembly according to an illustrative embodiment of the present invention is mounted.
Figure 2:
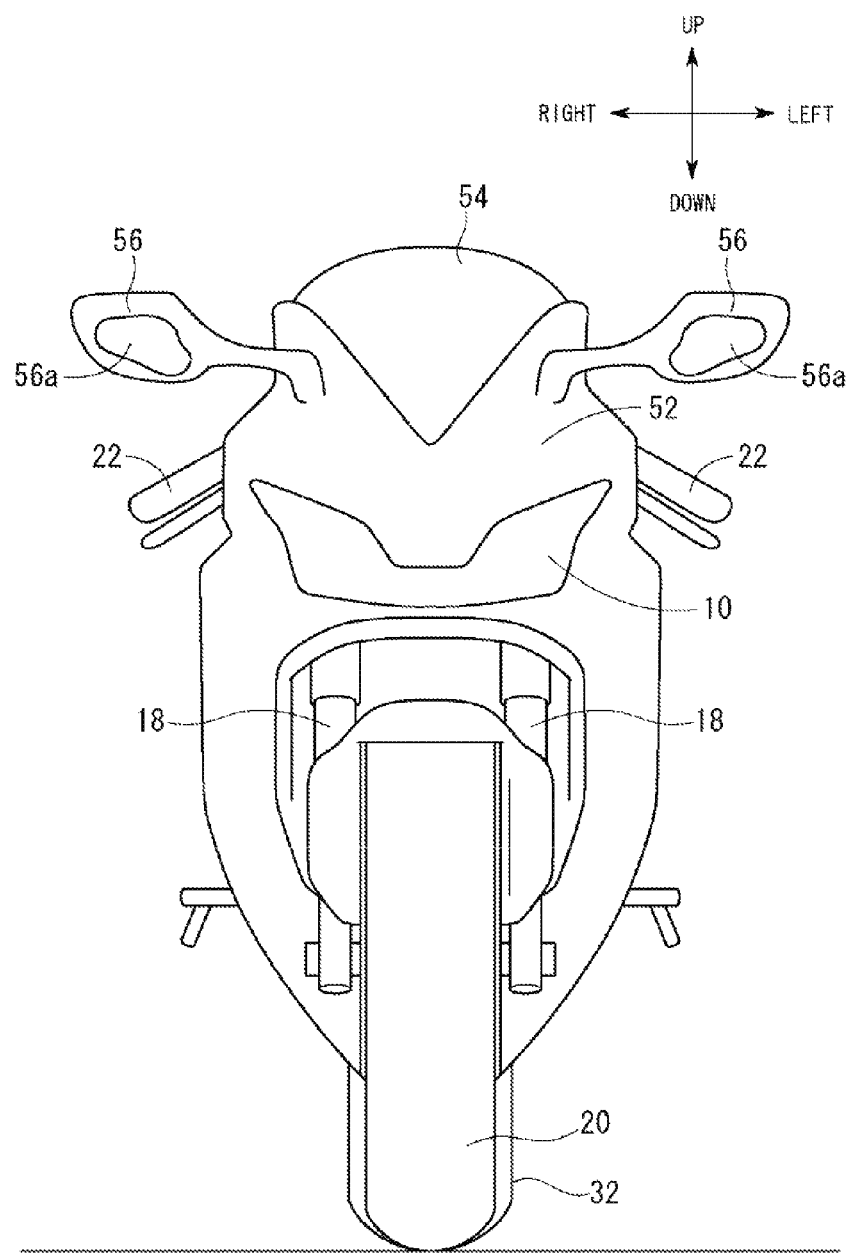
FIG. 2 is a front view of the motorcycle shown in FIG. 1.

FIG. 1 is a left side view of an external appearance of a motorcycle 12 which is a kind of saddle-type vehicle on which a headlamp assembly 10 according to an embodiment is mounted, and FIG. 2 is a front view of the motorcycle 12 shown in FIG. 1. Unless otherwise specified, the directions "frontward", "rearward", "upward", "downward", "leftward" and "rightward" are explained in accordance with the directions indicated by arrows in FIG. 1 and FIG. 2.

The motorcycle 12 includes: a vehicle body frame 14; a head pipe 16 which is mounted on a front end portion of the vehicle body frame 14; a pair of left and right front forks 18 which is rotatably supported on the head pipe 16; a front wheel 20 which constitutes a wheel to be steered which is pivotally supported on the pair of left and right front forks 18 in a rotatable manner; and a steerable bar-shaped handle 22 which is mounted on upper portions of the pair of left and right front forks 18.

The vehicle body frame 14 includes: a pair of left and right main frames 24 which extends rearward from the head pipe 16; a pair of left and right pivot plates 26 which is arranged behind the pair of left and right main frames 24; and a pair of left and right seat frames 28 which is mounted on the pair of left and right pivot plates 26 and extends obliquely in the rearward and upward direction. A power unit 30 which includes an engine and a transmission is mounted on the pair of left and right main frames 24. A swing arm 34 which rotatably and pivotally supports the rear wheel 32 constituting a drive wheel is swingably supported on the pivot plates 26.

A fuel tank 36 which stores fuel therein is arranged above the pair of left and right main frames 24. A driver's seat 38 on which a rider is seated is arranged behind the fuel tank 36 and above the pair of left and right seat frames 28. A pillion's seat 40 on which a pillion is seated is arranged behind the driver's seat 38. A front fender 42 is mounted on the pair of left and right front forks 18, and a rear fender 44 is mounted on rear portions of the pair of left and right seat frames 28. A license plate 46, a license lamp 48 which illuminates the license plate 46, and rear blinkers 50 are mounted on the rear fender 44.

The motorcycle 12 includes: an upper cowl 52 which is mounted on the vehicle body frame 14 and protects a front side of the motorcycle 12; a wind screen 54 which is arranged above the upper cowl 52; rear view mirrors 56 which are mounted on an upper portion of the upper cowl 52 and enable a rider to confirm an area behind the motorcycle 12; a headlamp assembly 10 which is mounted on a front portion of the upper cowl 52 and constitutes a headlight for illuminating an area in front of the motorcycle 12; a middle cowl 58 which protects a front side portion of the motorcycle 12; an under cover 60 which is arranged behind the middle cowl 58 and on a lower side of the motorcycle 12; side covers 62 which are arranged above the seat frames 28 and cover areas ranging from upper portions of the seat frames 28 to a lower portion of the driver's seat 38; and a rear cover 64 which is arranged behind the seat frame 28. A front blinker 56a is incorporated into the rear view mirror 56.

Figure 3:
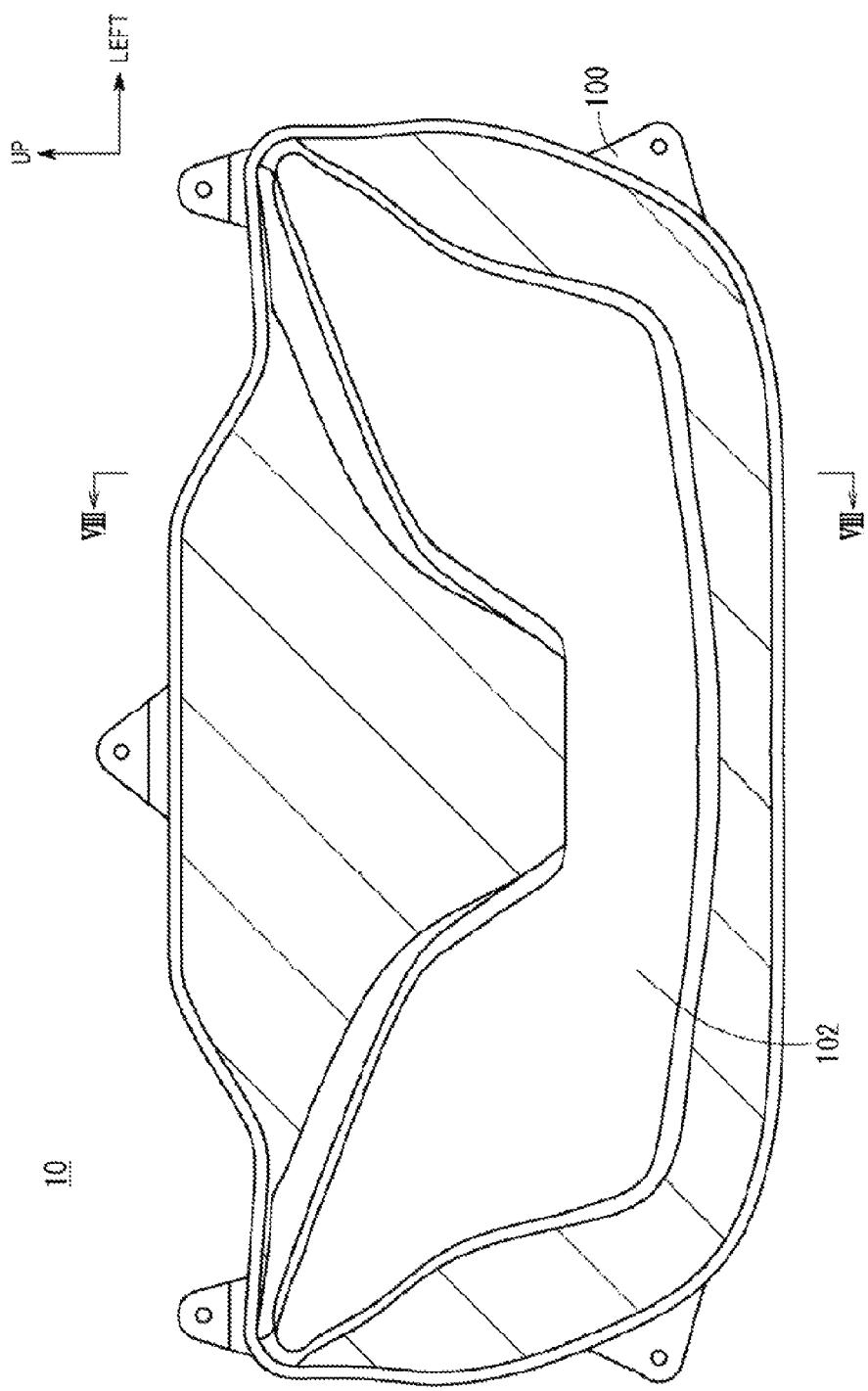
FIG. 3 is a front view of the headlamp assembly shown in FIG. 1.

FIG. 3 is a front view of the headlamp assembly 10 shown in FIG. 1. As shown in FIG. 3, the headlamp assembly 10 includes a housing 100 and an outer lens (lens) 102 which is arranged in front of the housing 100 and allows light to pass therethrough. A portion (a region indicated by hatching in FIG. 3) of the outer lens 102 is covered with the upper cowl 52.

Figure 4:
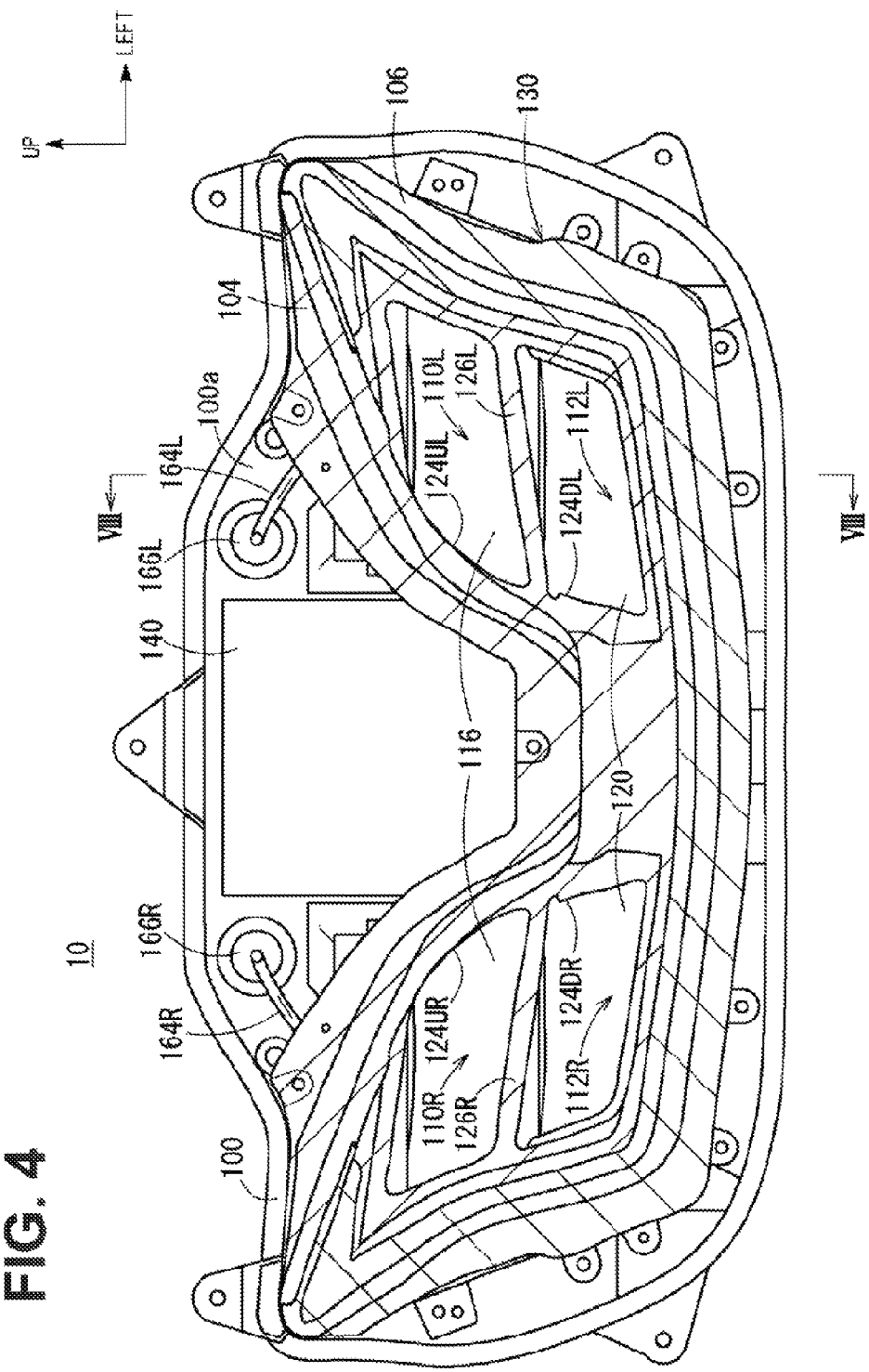
FIG. 4 is a view of the headlamp assembly shown in FIG. 3 when an outer lens is removed.
Figure 5:
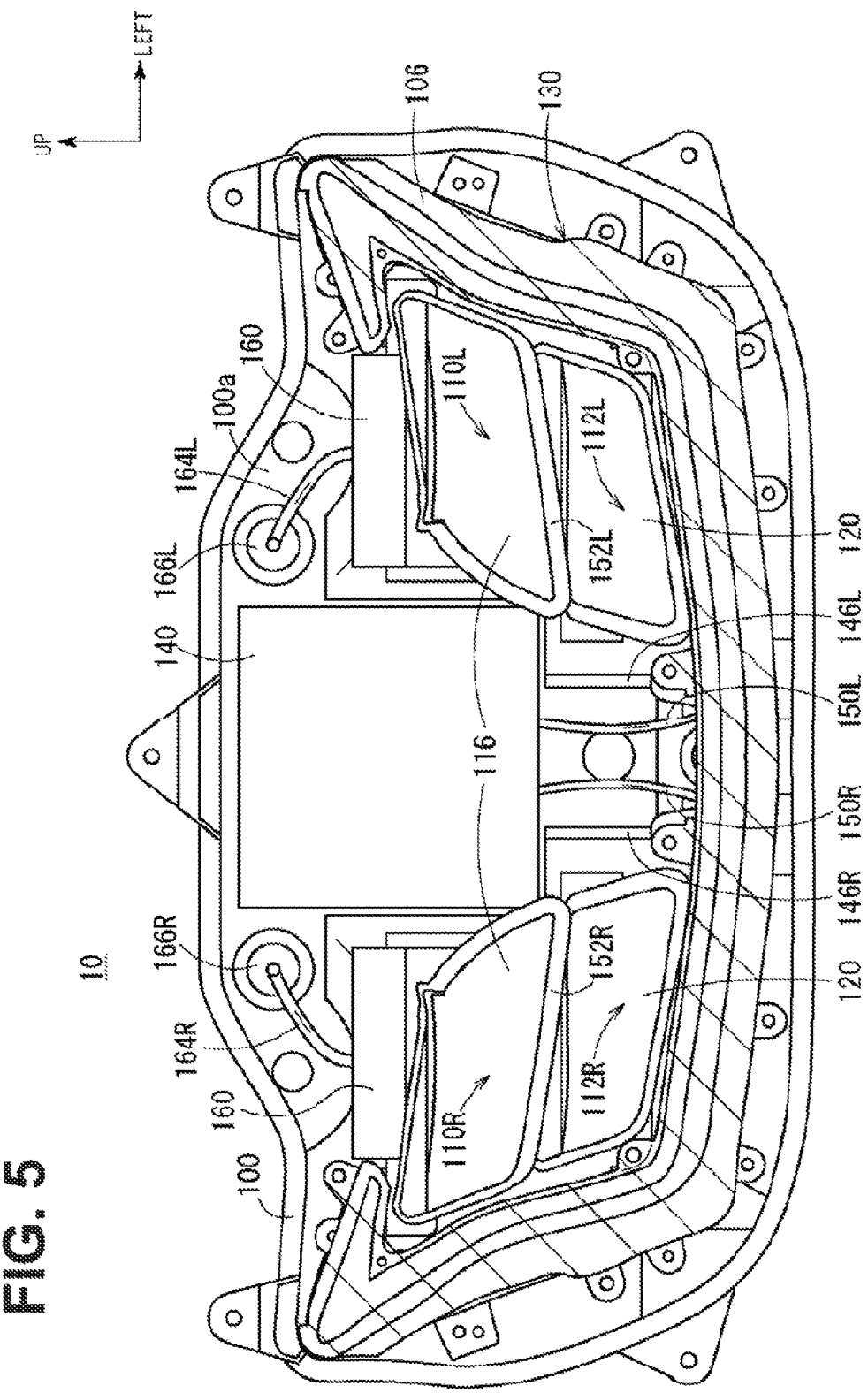
FIG. 5 is a view of the headlamp assembly shown in FIG. 4 when an extension cover is removed.
Figure 6:
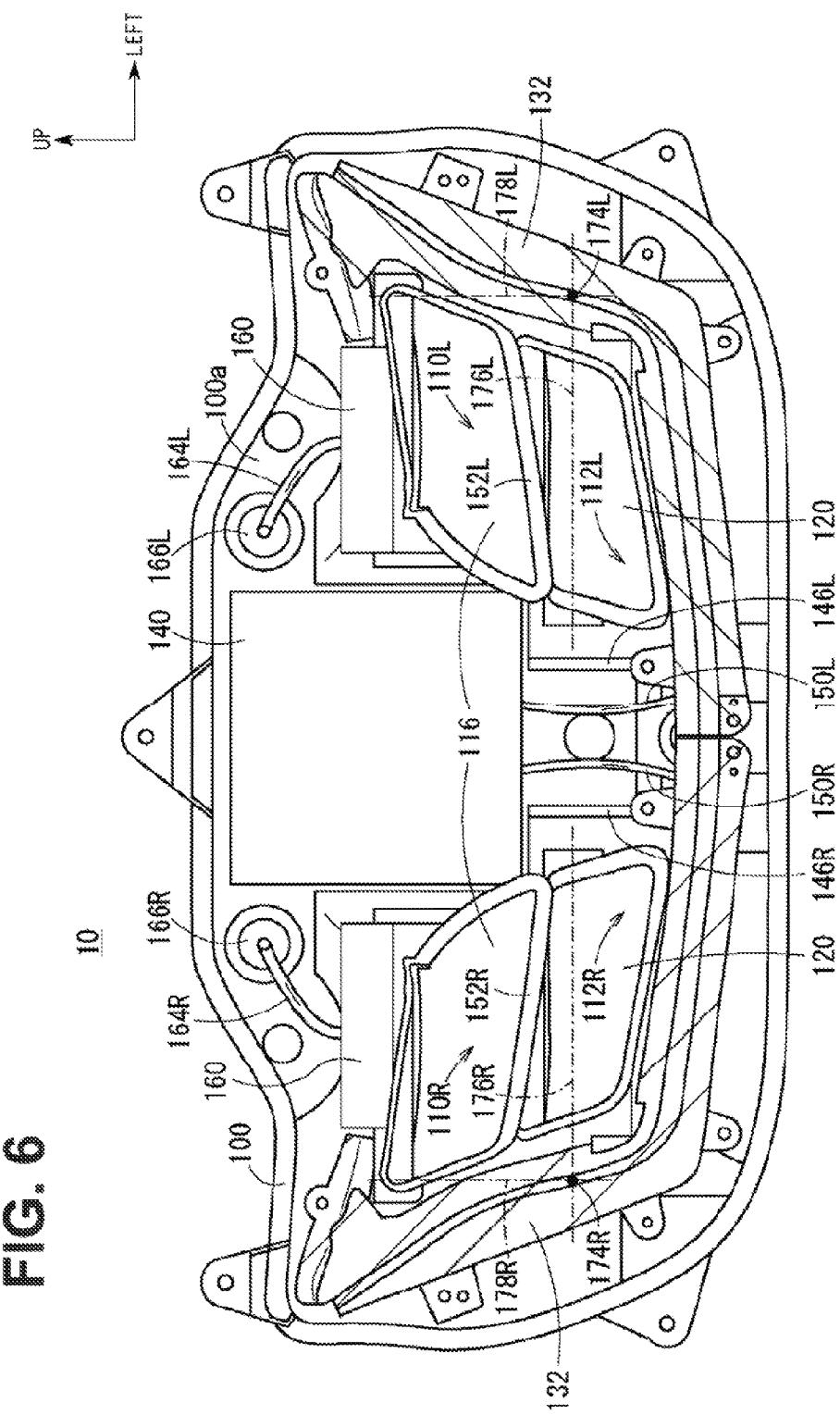
FIG. 6 is a view of the headlamp assembly shown in FIG. 5 when an inner lens is removed.
Figure 7:
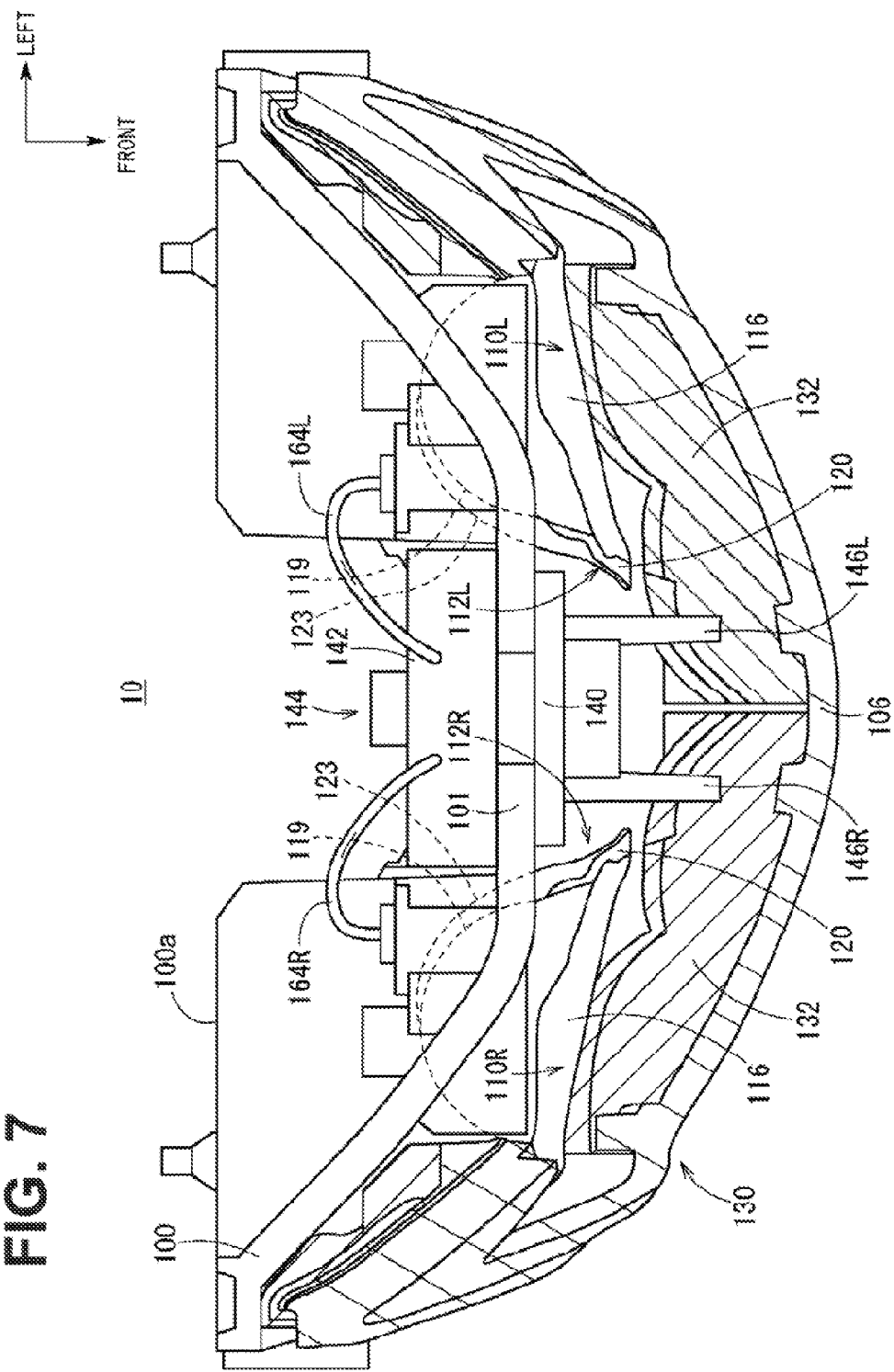
FIG. 7 is a plan view of the headlamp assembly shown in FIG. 5.
Figure 8:
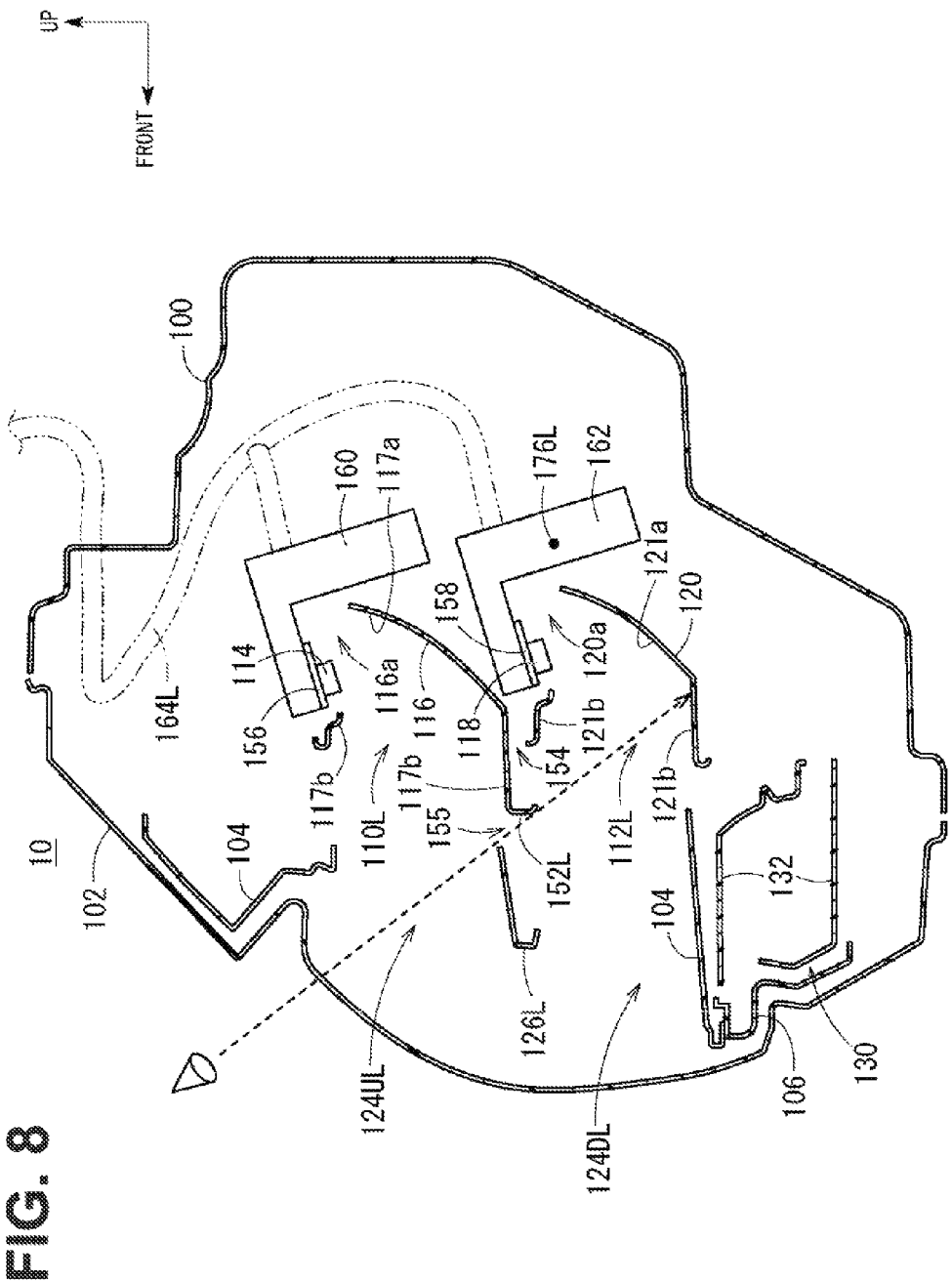
FIG. 8 is a cross-sectional view as viewed in the direction indicated by an arrow VIII-VIII in FIG. 3.
Figure 9:
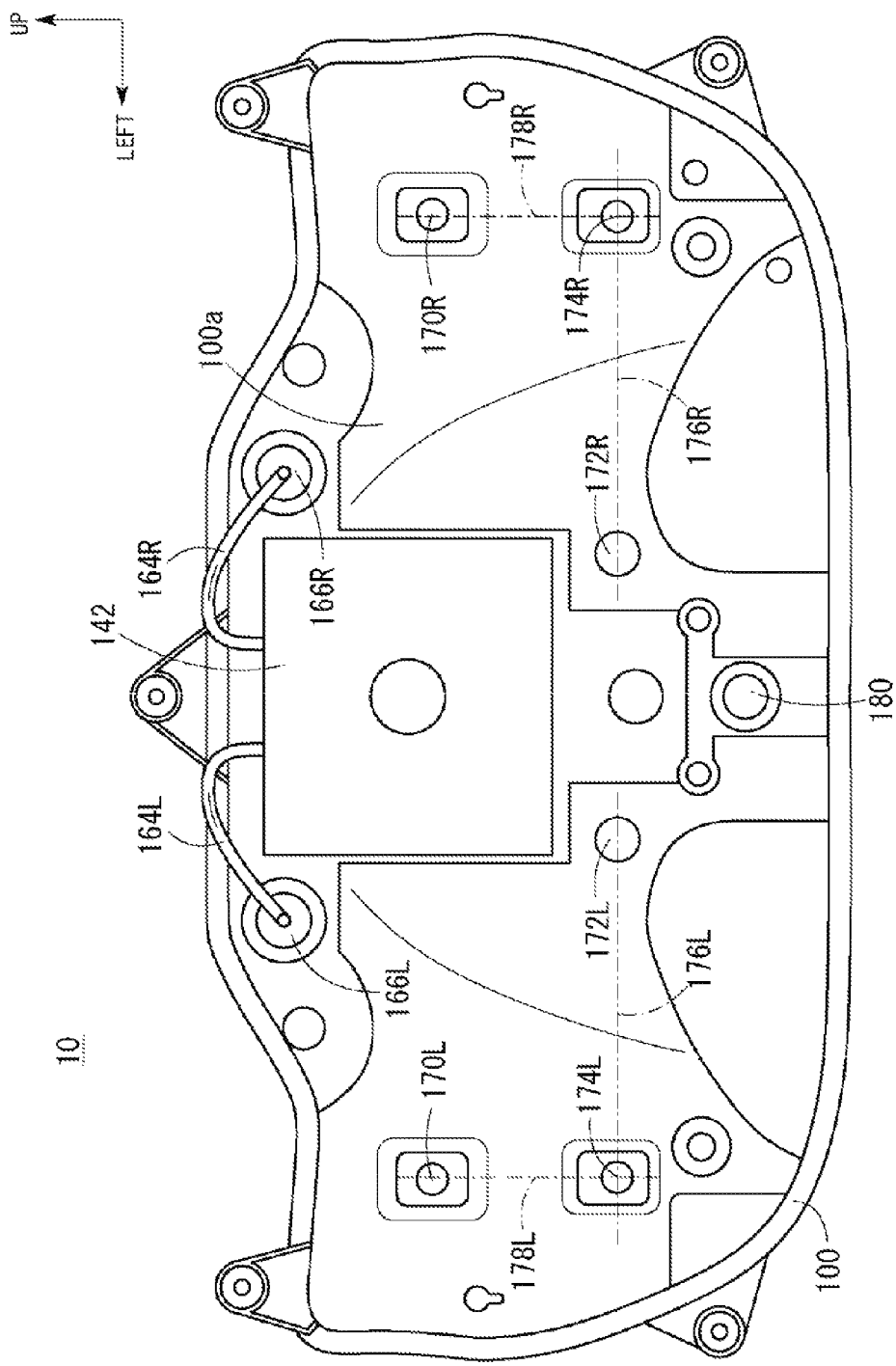
FIG. 9 is a back view of the headlamp assembly shown in FIG. 3.

FIG. 4 is a view of the headlamp assembly 10 shown in FIG. 3 in a state where the outer lens 102 is removed, FIG. 5 is a view of the headlamp assembly 10 shown in FIG. 4 in a state where an extension cover 104 is removed, FIG. 6 is a view of the headlamp assembly 10 shown in FIG. 5 in a state where an inner lens 106 is removed, FIG. 7 is a plan view of the headlamp assembly 10 shown in FIG. 5, FIG. 8 is a cross-sectional view as viewed in the direction indicated by an arrow VIII-VIII in FIG. 3, and FIG. 9 is a back view of the headlamp assembly 10 shown in FIG. 3.

The headlamp assembly 10 includes upper light-emitting portions (light-emitting portions) 110L, 110R for a headlight which are supported on the housing 100 and are arranged on left and right sides of the headlamp assembly 10 respectively, and lower light-emitting portions (light-emitting portions) 112L, 112R for a headlight which are supported on the housing 100 and are arranged on left and right sides of the headlamp assembly 10 respectively. The lower light-emitting portions 112L, 112R are arranged below the upper light-emitting portions 110L, 110R. The headlamp assembly 10 has a left-right symmetrical shape and hence, the upper light-emitting portion 110L and the lower light-emitting portion 112L are in left-right symmetry with the upper light-emitting portion 110R and the lower light-emitting portion 112R respectively. Other constitutional elements and members are also arranged in left-right symmetry.

The upper light-emitting portion 110L, 110R for a low beam includes a light source (first light source) 114 which is a light-emitting element such as an LED (Light-emitting Diode) (see FIG. 8) and a reflector (first reflector) 116 which reflects light emitted from the light source 114 frontward. In the same manner as the upper light-emitting portion 110L, 110R, the lower light-emitting portion 112L, 112R for a high beam also includes a light source (second light source) 118 which is a light-emitting element such as an LED (see FIG. 8) and a reflector (second reflector) 120 which reflects light emitted from the light source 118 frontward.

The reflector 116, 120 has the cup-shaped structure where a lateral width of the reflector 116, 120 is gradually narrowed as the reflector 116, 120 extends rearward (see FIG. 7). As shown in FIG. 8, the reflector 160, 120 includes a concave surface portion 117a, 121a and a forwardly extending portion 117b, 121b which extends frontward from an end portion of the concave surface portion 117a, 121a. The light source 114, 118 irradiates light downward and the concave surface portion 117a, 121a of the reflector 116, 120 reflects light irradiated from the light source 114, 118 frontward.

An opening portion 116a, 120a is formed on the upper forwardly extending portion 117b, 121b of the reflector 116, 120, and light emitted from the light source 114, 118 reaches an inner reflection surface of the concave surface portion 117a, 121a after passing through the opening portion 116a, 120a. Inner edges of the reflector 116, 120 are formed such that, as viewed in a front view of FIG. 6, the inner edges become further away from each other as the inner edges extend upward.

An extension cover 104 is arranged in front of the upper light-emitting portions 110L, 110R and the lower light-emitting portions 112L, 112R such that the extension cover 104 covers the upper light-emitting portions 110L, 110R and the lower light-emitting portions 112L, 112R. In the extension cover 104, opening portions 124UL, 124UR, 124DL, 124DR which allow light emitted from the upper light-emitting portions 110L, 110R and light emitted from the lower light-emitting portions 112L, 112R to pass therethrough and to advance toward a front side are formed.

The extension cover 104 includes extension members 126L, 126R. The extension member 126L partitions the opening portion 124UL and the opening portion 124DL from each other, and the extension member 126R partitions the opening portion 124UR and the opening portion 124DR from each other. The extension members 126L, 126R extend in the horizontal direction so as to approach front ends of lower edges (the lower forwardly extending portions 117b) of the upper light-emitting portions 110L, 110R (to be more specific, the reflectors 116) (see FIG. 8).

A turn signal lamp 130 is arranged on left and right lower sides of the extension cover 104. An inner lens 106 which functions as a lens of the turn signal lamp 130 is arranged along and below the extension cover 104 on left and right sides. The inner lens 106 allows light reflected frontward by the reflector 132 (see FIG. 6) of the turn signal lamp 130 arranged behind the inner lens 106 to pass therethrough. The reflector 132 reflects light emitted from a light source (not shown in the drawing) of the turn signal lamp 130 frontward.

On an inner side of a mounting surface 101 of a rear surface wall 100a of the housing 100 (in the inside of the headlamp assembly 10), a signal-lamp driver (driver) 140 which drives the light source for the turn signal lamp and has an approximately plate shape or an approximately box shape is mounted. On an outer side of the mounting surface 101 of the rear surface wall 100a of the housing 100, a headlight-use driver (driver) 142 which drives the light sources 114, 118 is mounted. That is, the signal-lamp driver 140 and the headlight-use driver 142 are mounted on the housing 100 in a state where the rear surface wall 100a of the housing 100 is sandwiched between these drivers 140, 142 and the thickness direction of these drivers 140, 142 is directed in the longitudinal direction (see FIG. 7). The mounting surface 101 has an approximately planar shape.

The signal-lamp driver 140 and the headlight-use driver 142 are mounted on an upper center portion of the rear surface wall 100a such that an area where the signal-lamp driver 140 is mounted on the rear surface wall 100a of the housing 100 and an area where the headlight-use driver 142 is mounted on the rear surface wall 100a of the housing 100 overlap with each other (see FIG. 5, FIG. 9). The reflectors 116 of the upper light-emitting portions 110L, 110R are arranged in a more spaced-apart manner in the lateral direction than the reflectors 120 of the lower light-emitting portions 112L, 112R are (see FIG. 7). The signal-lamp driver 140 and the headlight-use driver 142 are arranged above the reflectors 120, while the signal-lamp driver 140 and the headlight-use driver 142 are arranged at substantially the same height as one another.

The rear surface wall 100a of the housing 100 on left and right sides bulges in a rearwardly projecting manner. Due to such bulging of the rear surface wall 100a, a recessed portion 144 which is indented frontward is formed on the rear surface wall 100a of the housing 100 at the center, and the headlight-use driver 142 is mounted on a mounting surface 101 of the recessed portion 144. The rear surface wall 100a of the housing 100 on left and right sides bulges in a rearwardly projecting manner and hence, wide spaces can be ensured behind heat sinks 160, 162 provided in the inside of the headlamp assembly 10 (see FIG. 8) whereby air around the heat sinks 160, 162 can easily form convention flows. Accordingly, it is possible to suppress the elevation of temperature of air in the inside of the headlamp assembly 10 caused by a quantity of heat generated by the light source 114, 118. Further, the interference between the head pipe 16 and the headlamp assembly 10 can be prevented by the recessed portion 144.

Lateral widths of the reflectors 116, 120 are gradually narrowed as the reflectors 116, 120 extend rearward (to be more specific, the reflectors 116, 120 have inclined surfaces 119, 123 whose rear surfaces extend in the direction separating from each other as the reflectors 116, 120 extend rearward) and hence, there exists a relatively wide space between the left and right reflectors 116, 120 and behind and in the vicinity of the left and right reflectors 116, 120. Accordingly, in arranging the signal-lamp driver 140 between the left and right upper light-emitting portions 110L, 116R and the headlight-use driver 142 between the left and right lower light-emitting portions 112L, 112R, the headlamp assembly 10 can be miniaturized also by making use of the space.

The reason why the signal-lamp driver 140 is arranged inside the headlamp assembly 10 and the headlight-use driver 142 is arranged outside the headlamp assembly 10 is explained. A quantity of light for a low beam and a quantity of light for a high beam are stipulated in laws in many cases and hence, the number of cases where electric power fluctuates depending on a type of motorcycle is relatively small and hence, the headlight-use driver 142 is applicable to other types of motorcycles in many cases. Accordingly, it is often the case where the headlight-use driver 142 having a waterproof or water-resistant function is used, so that the headlight-use driver 142 can be arranged at any portion of a motorcycle. The headlight-use driver 142 also consumes a large quantity of electric power. Accordingly, in this embodiment, by arranging the headlight-use driver 142 having a waterproof function outside the headlamp assembly 10, the cooling structure in the inside of the headlamp assembly 10 can be simplified and the headlamp assembly 10 per se can be miniaturized.

On the other hand, the turn signal lamp 130 is provided for enhancing the aesthetic appearance of the motorcycle in many cases and hence, it is often the case where an output performance and a quantity of electric power largely differ depending on the type of a motorcycle and hence, the turn signal lamp requires dedicated designing in many cases. Under such circumstances, unlike the headlight-use driver 142, there has been a demand for omitting functions such as a waterproof function which can be omitted from functions of the signal-lamp driver 140 for reducing a manufacturing cost. In this embodiment, the signal-lamp driver 140 is arranged inside the headlamp assembly 10 so that a waterproof function can be omitted from the functions of the signal-lamp driver 140 whereby a manufacturing cost of the signal-lamp driver 140 can be reduced.

A pair of left and right eaves portions 146L, 146R is arranged below the signal-lamp driver 140 and between the lower light-emitting portions 112L, 112R. The eaves portion 146L is provided for blocking light from the lower light-emitting portion 112L which advances rightward such that the light from the light-emitting portion 112L cannot be seen through a gap formed between the lower light-emitting portion 112L and the extension cover 104 when the headlamp assembly 10 is viewed from a right side. In the same manner as the eaves portion 146L, the eaves portion 146R is provided for blocking light from the lower light-emitting portion 112R which advances leftward such that the light from the lower light-emitting portion 112R cannot be seen through a gap formed between the lower light-emitting portion 112R and the extension cover 104 when the headlamp assembly 10 is viewed from a left side. Power lines 150L, 150R which extend from a lower side of the signal-lamp driver 140 pass through between the eaves portions 146L, 146R and are connected to a printed circuit board not shown in the drawing on which the light source for the turn signal lamp 130 is mounted.

On the reflectors 116 of the upper light-emitting portions 110L, 110R, flange portions 152L, 152R which extend downward from lower edges of the reflectors 116 are mounted respectively (see FIG. 5, FIG. 8). The flange portion 152L mounted on the reflector 116 of the upper light-emitting portion 110L extends to a right edge of the reflector 116, and the flange portion 152R mounted on the reflector 116 of the upper light-emitting portion 110R extends to a left edge of the reflector 116.

The flange portion 152L, 152R is provided for concealing a gap 154 (see FIG. 8) formed between a lower edge of the reflector 116 and an upper edge of the reflector 120, and the flange portion 152L, 152R extends downward from an area in the vicinity of the upper edge of the reflector 120 or from the upper edge of the reflector 120. Further, the flange portion 152L, 152R extends downward to an extent that the concave surface portion 121a of the reflector 120 cannot be seen through a gap 155 formed between the extension member 126L, 126R and the forwardly extending portion 117b formed on a lower side of the reflector 116. The extension members 126L, 126R are arranged at the substantially same height as the flange portions 152L, 152R.

As shown in FIG. 8, the light sources 114, 118 are mounted on lower surfaces of the printed circuit boards 156, 158 respectively, and upper surfaces of the printed circuit boards 156, 158 are connected to the heat sinks 160, 162. The heat sinks 160, 162 are provided for cooling heat which the light sources 114, 118 generate, and have an L shape so as to cover upper sides and rear sides of the reflectors 116, 120 respectively.

As shown in FIG. 8 and FIG. 9, the power lines 164L, 164R which extend from the headlight-use driver 142 are introduced into the inside of the headlamp assembly 10 through grommet 166L, 166R, and are connected to the printed circuit boards 156, 158.

Reference symbol 170L shown in FIG. 9 indicates a vertical aiming bolt for performing the aiming adjustment of the upper light-emitting portion 110L and the lower light-emitting portion 112L integrally in the vertical direction, and reference symbol 170R indicates a vertical aiming bolt for performing the aiming adjustment of the upper light-emitting portion 110R and the lower light-emitting portion 112R integrally in the vertical direction. The vertical aiming bolts 170L, 170R are arranged in the vicinity of the upper edges of the reflectors 116 of the upper light-emitting portions 110L, 110R. Reference symbol 172L indicates a lateral aiming bolt for performing the aiming adjustment of the upper light-emitting portion 110L and the lower light-emitting portion 112L integrally in the lateral direction, and reference symbol 172R indicates a lateral aiming bolt for performing the aiming adjustment of the upper light-emitting portion 110R and the lower light-emitting portion 112R integrally in the lateral direction. The lateral aiming bolts 172L, 172R are arranged in the vicinity of the lower edges of the reflectors 120 of the lower light-emitting portions 112L, 112R.

Reference symbols 174L, 174R indicate aiming reference positions, and the aiming adjustment in the vertical direction and the aiming adjustment in the lateral direction are performed with reference to the aiming reference positions 174L, 174R. In this case, vertical aiming axes 176L, 176R are lines connecting the aiming reference positions 174L, 174R and the lateral aiming bolts 172L, 172R respectively. Lateral aiming axes 178L, 178R are lines connecting the aiming reference positions 174L, 174R and the vertical aiming bolts 170L, 170R respectively.

The vertical aiming axes 176L, 176R are arranged in the vicinity of the flange portions 152L, 152R, and are arranged below the lower edges of the reflectors 116 (see FIG. 6). Reference symbol 180 indicates an air permeable waterproof material which allows air to pass therethrough but prevents water, dust and the like from passing therethrough (for example, GORE-TEX (trademark)).

As described above, the flange portions 152L, 152R which extend downward from the lower edges of the reflectors 116 are formed on the reflectors 116 of the upper light-emitting portions 110L, 110R and hence, when the headlamp assembly 10 is viewed from a front side or a front upper side over the outer lens 102, the gaps 154 formed between the reflectors 116 of the upper light-emitting portions 110L, 110R and the reflectors 120 of the lower light-emitting portions 112L, 112R become hard to see, light-emitting areas of the upper light-emitting portions 110L, 110R can be ensured whereby the degree of freedom in design is enhanced.

To make the gaps 154 formed between the reflectors 116 and the reflectors 120 hard to see, it is necessary to arrange the lower edges of the reflectors 116 and the extension members 126L, 126R close to each other (it is necessary to make the gaps 155 small). In this embodiment, the aiming axes of the upper light-emitting portions 110L, 110R and the lower light-emitting portions 112L, 112R which are subjected to the aiming adjustment in the vertical direction integrally are arranged in the vicinity of the flange portions 152L, 152R and hence, it is possible to prevent the reflectors 116 from largely moving in the longitudinal direction with respect to the extension members 126L, 126R due to the aiming adjustment whereby the gaps 155 can be easily set thus making the designing of the flange portions 152L, 152R easy.

The lower light-emitting portions 112L, 112R are provided for reflecting light which is irradiated downward from the light source 118 frontward by the reflectors 120 and hence, upper portions of the lower light-emitting portions 112L, 112R (upper portion of the reflector 120) become dark compared to lower portions of the lower light-emitting portions 112L, 112R. Accordingly, even when the flange portions 152L, 152R extend downward from the lower edges of the reflectors 116 of the upper light-emitting portions 110L, 110R, the flange portions 152L, 152R hardly influence the light-emitting areas and the external appearance of the headlamp assembly 10.

The flange portions 152L, 152R extend downward to an extent that at least the concave surface portions 121a of the reflectors 120 are not visible through the gaps 155. Accordingly, the concave surface portions 121a are not substantially visible through the gaps 155 and hence, the external appearance of the headlamp assembly 10 can be enhanced.

The signal-lamp driver 140 and the headlight-use driver 142 are arranged between the reflectors 116 of the upper light-emitting portions 110L, 110R and the reflectors 120 of the lower light-emitting portions 112L, 112R and behind and in the vicinity of the reflectors 116, 120 and hence, the degree of freedom in designing arrangement positions of the signal-lamp driver 140 and the headlight-use driver 142 can be enhanced. Further, the reflectors 116, 120 respectively include the inclined surfaces 119, 123 whose rear surfaces extend in the direction separating from each other as the reflectors 116, 120 extend rearward and hence, the signal-lamp driver 140 and the headlight-use driver 142 which are arranged between the left and right upper light-emitting portions 110L, 110R and the left and right lower light-emitting portions 112L, 112R respectively can be arranged on a more frontward side whereby the headlamp assembly 10 can be miniaturized.

The signal-lamp driver 140 and the headlight-use driver 142 are supported on the rear surface wall 100a of the housing 100 and hence, the signal-lamp driver 140 and the headlight-use driver 142 which are arranged behind and in the vicinity of the reflectors 116, 120 can be easily supported.

Although the headlight-use driver 142 has a waterproof function, the headlight-use driver 142 is supported on an outer side of the rear surface wall 100a of the housing 100 and hence, the heat radiation performance of the headlight-use driver 142 can be easily ensured.

The headlight-use driver 142 is arranged in the recessed portion 144 indented frontward which is formed on the rear surface wall 100a of the housing 100 and hence, the power lines 164L, 164R which connect the headlight-use driver 142 and the light sources 114, 118 to each other can be shortened.

The signal-lamp driver 140 is arranged in the inside of the housing 100 such that the rear surface wall 100a of the housing 100 is sandwiched between the signal-lamp driver 140 and the headlight-use driver 142. Accordingly, it is possible to protect the signal-lamp driver 140 from water or dust. Further, the signal-lamp driver 140 is mounted by making use of a flat surface, that is, the mounting surface 101 of the rear surface wall 100a provided for mounting the headlight-use driver 142. Accordingly, it is unnecessary to additionally provide mounting surfaces 101 for mounting the respective drivers 140, 142 thus eventually making the headlamp assembly 10 compact.

Figure 10:
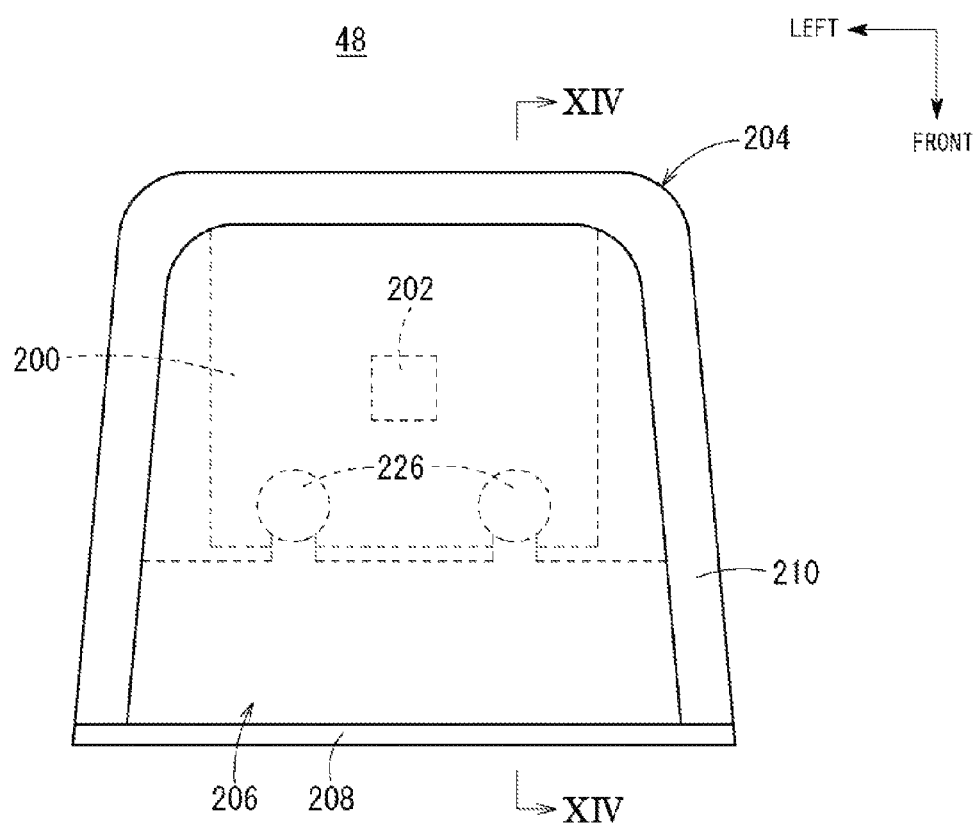
FIG. 10 is a bottom plan view of a license lamp.
Figure 11:
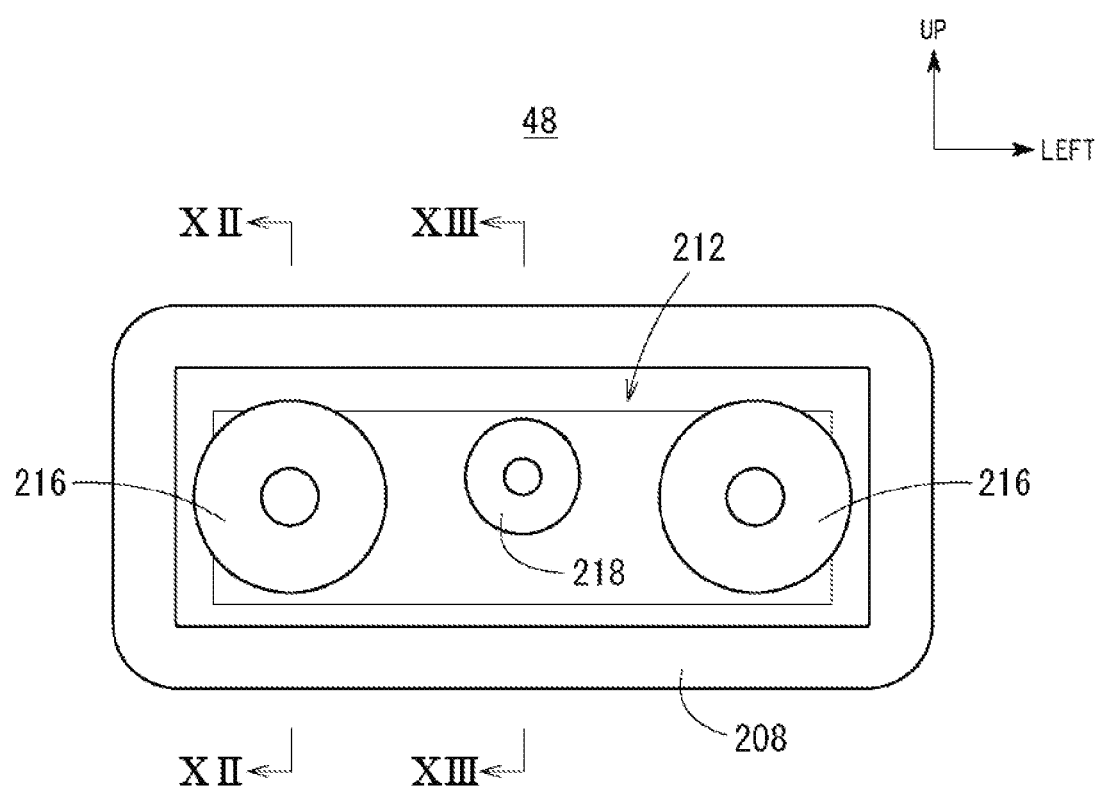
FIG. 11 is a front view of the license lamp.
Figure 12:
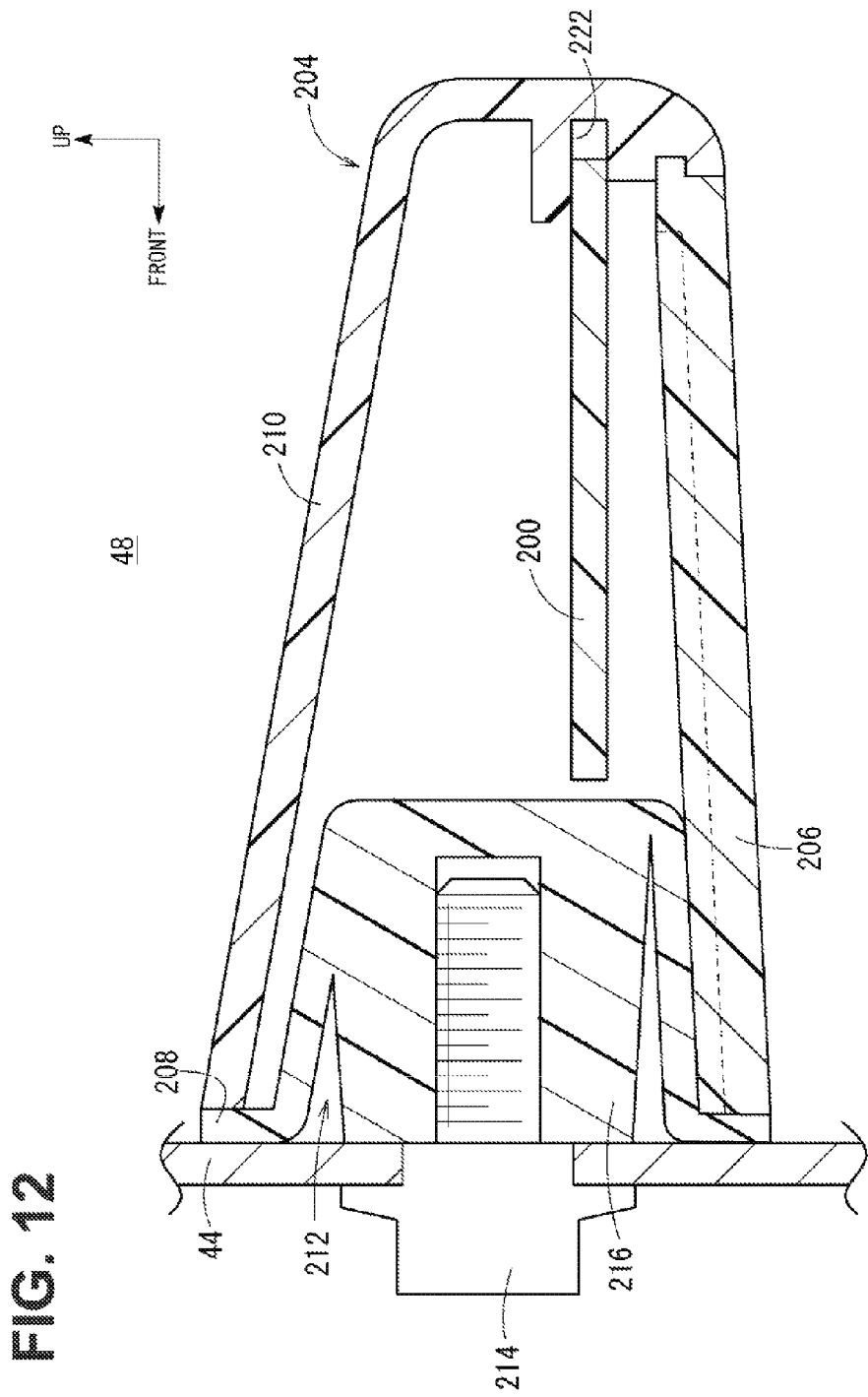
FIG. 12 is a cross-sectional view as viewed in the direction indicated by an arrow XII-XII in FIG. 11.
Figure 13:
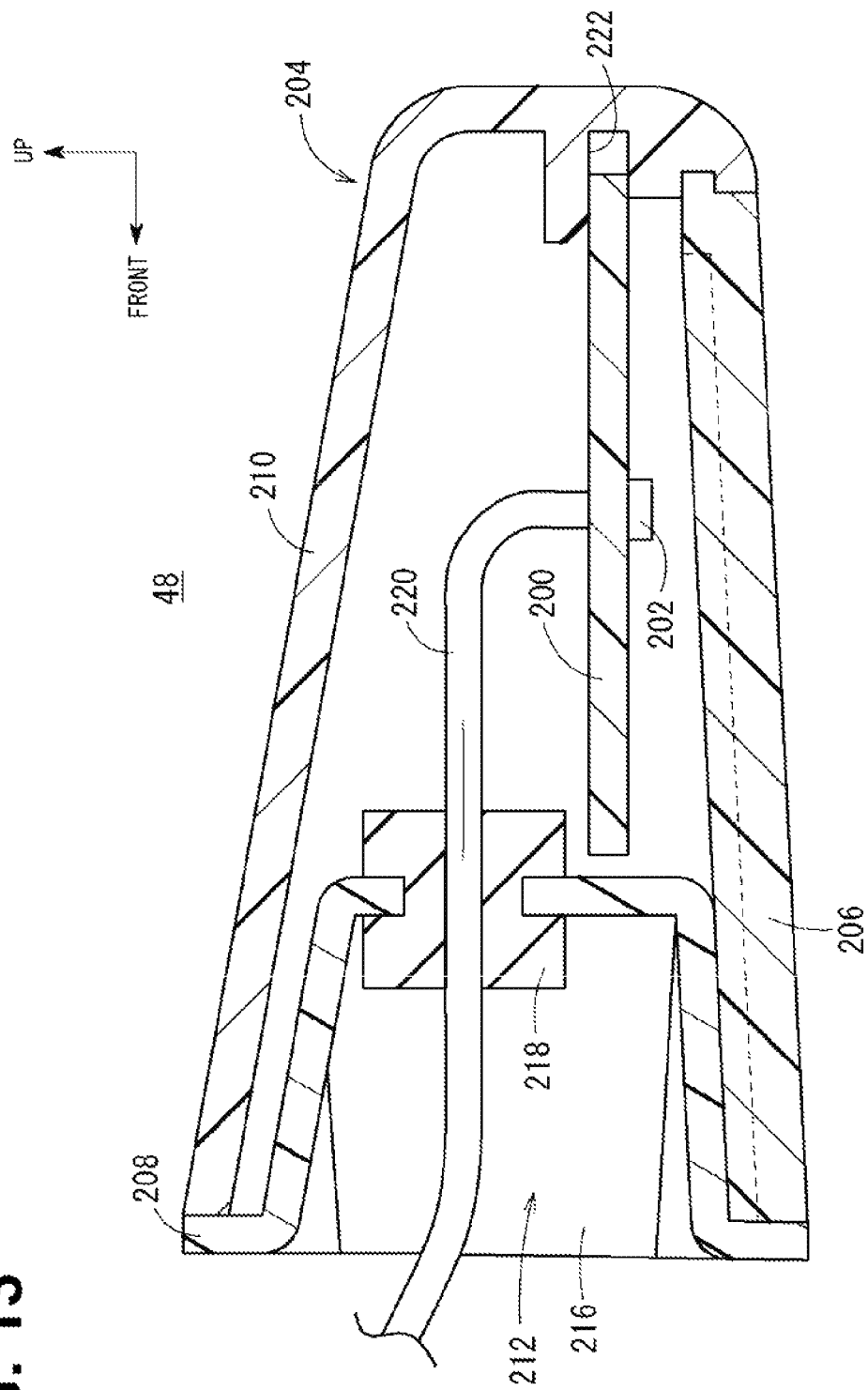
FIG. 13 is a cross-sectional view as viewed in the direction indicated by an arrow XIII-XIII in FIG. 11.
Figure 14:
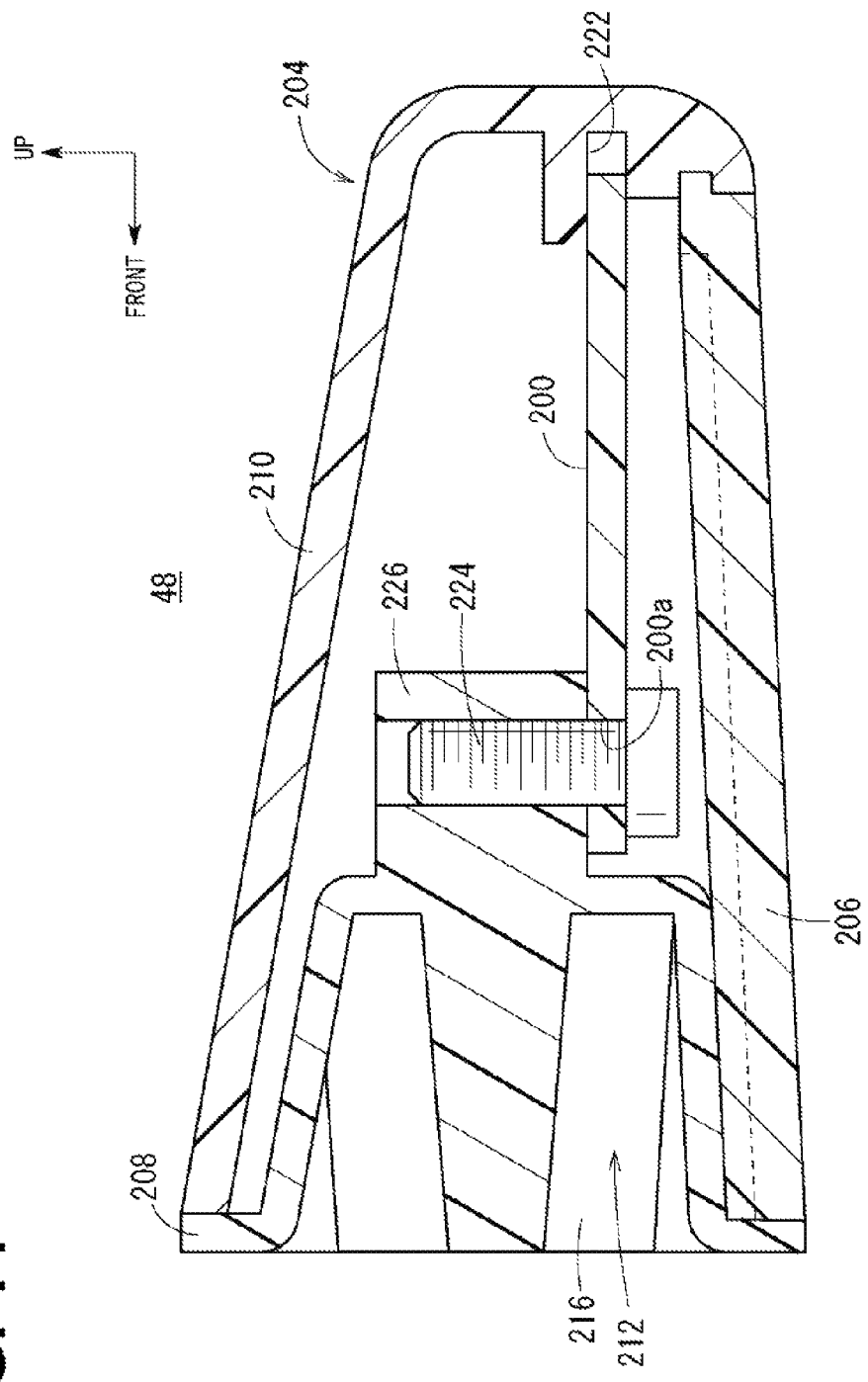
FIG. 14 is a cross-sectional view as viewed in the direction indicated by an arrow XIV-XIV in FIG. 10.

FIG. 10 is a bottom plan view of the license lamp 48, FIG. 11 is a front view of the license lamp 48, FIG. 12 is a cross-sectional view as viewed in the direction indicated by an arrow XII-XII in FIG. 11, FIG. 13 is a cross-sectional view as viewed in the direction indicated by an arrow XIII-XIII in FIG. 11, and FIG. 14 is a cross-sectional view as viewed in the direction indicated by an arrow XIV-XIV in FIG. 10.

The license lamp 48 includes: a light source 202 which is a light-emitting element such as an LED mounted on the printed circuit board 200; a case member 204 which stores the printed circuit board 200 and the light source 202, and a lens 206 which is mounted on a lower side of the case member 204 and allows light irradiated from the light source 202 to pass therethrough.

The case member 204 includes a base portion 208 which holds the light source 202 thereon and is mounted on the rear fender 44, and a cover portion 210 which is mounted on the base portion 208 by ultrasonic welding or the like so as to cover the light source 202 from behind. The lens 206 is mounted on lower sides of the base portion 208 and the cover portion 210 using an adhesive agent or the like.

As shown in FIG. 11, an inner side of the base portion 208 is recessed rearward as viewed in a front view thus forming a recessed portion 212, and nut portions 216 which are threadably engaged with bolts 214 for mounting the base portion 208 on the rear fender 44 are formed on left and right sides of the recessed portion 212 (see FIG. 12). A grommet 218 is provided at the center of the recessed portion 212. A power line 220 is introduced into the inside of the license lamp 48 through the grommet 218 and is connected to the printed circuit board 200 (see FIG. 13).

The printed circuit board 200 is fixed to the case member 204 in such a manner that one end of the printed circuit board 200 is inserted into a recessed portion 222 which is formed on the cover portion 210, and a screw 224 which is inserted into a hole 200a formed in the other end of the printed circuit board 200 is threadably engaged with a nut portion 226 of the base portion 208 (see FIG. 14). The nut portion 226 is formed in the inside of the license lamp 48 and is arranged in the recessed portion 222 of the base portion 208.

Although the invention has been explained in conjunction with the preferred embodiment heretofore, the technical scope of the invention is not limited to the scope described in the above-mentioned embodiment. It is apparent to those who are skilled in the art that various modifications and improvements may be added to the above-mentioned embodiment. It is also apparent from the description of the Scope of Claims that embodiments to which such modifications and improvements are added also fall within the technical scope of the invention. Further, symbols with parenthesis described in the Scope of Claims are added in conformity with symbols in the attached drawings for facilitating the understanding of the invention and hence, it should not be construed that the invention is limited to elements to which symbols are given.

In other words, although the present invention has been described herein with respect to a specific illustrative embodiment, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE NUMERALS
AND SIGNS

10: headlamp assembly
12: motorcycle
100: housing
100a: rear surface wall
102: outer lens
104: extension cover
106: inner lens
110L, 110R: upper light-emitting portion
112L, 112R: lower light-emitting portion
114, 118, 202: light source
116, 120, 132: reflector
126L, 126R; extension member
117a, 121a: concave surface portion
117b, 121b: forwardly extending portion
119, 123: inclined surface
130: turn signal lamp
140: signal-lamp driver
142: headlight-use driver
144: recessed portion
146L, 146R: eaves portion
152L, 152R: flange portion
154, 155: gap
156, 158, 200: printed circuit board
160, 162: heat sink
176L, 176R: vertical aiming axis

What is claimed is:

1. A headlamp assembly for a saddle-type vehicle, said headlamp assembly comprising:
left and right light-emitting portions arranged on left and right sides, respectively, each of the light-emitting portions comprising a light source and a concave reflector disposed proximate the light source for reflecting light forwardly, each reflector having an inclined surface, and having an upper surface and a rear surface, the inclined surface being configured such that the rear surfaces of the reflectors extend in directions separating from each other as the reflectors extend rearwardly, and two heat sinks each having an L-shape cover the upper surface and rear surfaces, respectively, of the reflectors;
a housing which supports the light emitting portions while covering the light emitting portions from behind; and
a lens which covers a front side of the light emitting portions while allowing light to pass therethrough;
wherein a driver for driving the light sources of the left and right light-emitting portions is arranged behind and between the left and right reflectors, said driver having power lines to connect the driver to the light-emitting portions;
wherein the driver is supported on an outer side of a rear surface wall of the housing and is arranged in a recessed, forwardly indented portion which is formed in the rear surface wall of the housing, and
wherein the rear surface wall of the housing bulges in a rearwardly projecting manner to form spaces behind the heat sinks whereby air around the heat sinks forms convection flows,
wherein the power lines are shortened due to the placement of the driver and the headlamp assembly is compact due to the structure of the headlamp assembly.

2. The headlamp assembly for a saddle-type vehicle according to claim 1, wherein the driver is treated to be water-resistant.

3. The headlamp assembly for a saddle-type vehicle according to claim 2, wherein: the driver is a headlight-use driver for driving the light source for a headlight, the headlamp assembly further comprises a turn signal lamp, and a signal-lamp driver for the turn signal lamp is arranged inside of the housing, in a state where the rear surface wall of the housing is sandwiched between the headlight-use driver and the signal-lamp driver.

4. The headlamp assembly for a saddle-type vehicle according to claim 1, wherein: the driver is a headlight-use driver for driving the light source for a headlight, the headlamp assembly further comprises a turn signal lamp, and a signal-lamp driver for the turn signal lamp is arranged inside of the housing, in a state where the rear surface wall of the housing is sandwiched between the headlight-use driver and the signal-lamp driver.

5. A headlamp assembly for a saddle-type vehicle, said headlamp assembly comprising:
a hollow housing;
left and right light-emitting portions arranged inside of the housing on left and right sides thereof, respectively, each of the light-emitting portions comprising a light source and a concave reflector disposed proximate the light source for reflecting light forwardly, each reflector having an inclined surface and having an upper surface and a rear surface, the inclined surface being configured such that the rear surfaces of the reflectors extend in directions separating from each other as the reflectors extend rearwardly, and two heat sinks each having an L-shape cover the upper surface and rear surfaces, respectively, of the reflectors;
a lens which covers a front side of the light emitting portions while allowing light to pass therethrough;
a headlight-use driver for driving the light sources of the left and right light-emitting portions, said driver having power lines to connect the driver to the light-emitting portions;
a turn signal lamp, and a signal-lamp driver for the turn signal lamp;
wherein the headlight-use driver is arranged on an outer side of a rear surface wall of the housing, behind and between the left and right reflectors in a recessed, forwardly indented portion which is formed in the rear surface wall of the housing; and
wherein the signal-lamp driver for the turn signal lamp is arranged inside of the housing, in a state where the rear surface wall of the housing is sandwiched between the headlight-use driver and the signal-lamp driver, and
wherein the rear surface wall of the housing bulges in a rearwardly projecting manner to form spaces behind the heat sinks whereby air around the heat sinks forms convection flows, and
wherein the power lines are shortened due to the placement of the driver and the headlamp assembly is compact due to the structure of the headlamp assembly.

6. The headlamp assembly for a saddle-type vehicle according to claim 5, wherein the headlight-use driver is treated to be water-resistant.

7. A headlamp assembly for a saddle-type vehicle, said headlamp assembly comprising:
a hollow housing;

left and right light-emitting portions arranged inside of the housing on left and right sides thereof, respectively, each of the light-emitting portions comprising a light source and a concave reflector disposed proximate the light source for reflecting light forwardly, each reflector having an inclined surface and having an upper surface and a rear surface, the inclined surface being configured such that the rear surfaces of the reflectors extend in directions separating from each other as the reflectors extend rearwardly, and two heat sinks each having an L-shape cover the upper surface and rear surfaces, respectively, of the reflectors;

a lens which covers a front side of the light emitting portions while allowing light to pass therethrough;

a headlight-use driver for driving the light sources of the left and right light-emitting portions, said driver having power lines to connect the driver to the light-emitting portions;

a turn signal lamp, and a signal-lamp driver for the turn signal lamp;

wherein the headlight-use driver is treated to be water resistant, and is arranged on an outer side of a rear surface wall of the housing, behind, between, and above the left and right reflectors in a recessed, forwardly indented portion which is formed in the rear surface wall of the housing; and wherein the signal-lamp driver for the turn signal lamp is arranged inside of the housing, in a state where the rear surface wall of the housing is sandwiched between the headlight-use driver and the signal-lamp driver, and is located above the reflectors and at substantially the same height as the headlight use driver, and wherein the rear surface wall of the housing bulges in a rearwardly projecting manner to form spaces behind the heat sinks whereby air around the heat sinks forms convection flows, and wherein the power lines are shortened due to the placement of the driver and the headlamp assembly is compact due to the structure of the headlamp assembly.

* * * * *